US012751350B2

(12) United States Patent
Perez

(10) Patent No.: US 12,751,350 B2
(45) Date of Patent: Oct. 6, 2026

(54) PROTECTIVE FRAME FOR WHEEL OF AN AGRICULTURAL WORKING VEHICLE AND METHOD FOR MOUNTING A PROTECTIVE FRAME ON A WHEEL OF AN AGRICULTURAL WORKING VEHICLE

(71) Applicant: CNH Industrial America LLC, New Holland, PA (US)

(72) Inventor: Thiago Kato Perez, Piracicaba (BR)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 788 days.

(21) Appl. No.: 17/959,435

(22) Filed: Oct. 4, 2022

(65) Prior Publication Data

US 2023/0106231 A1 Apr. 6, 2023

(30) Foreign Application Priority Data

Oct. 4, 2021 (BR) .......................... 1020210199466

(51) Int. Cl.

*A01B 76/00* (2006.01)
*A01M 7/00* (2006.01)
*B62D 25/16* (2006.01)
*B62D 25/18* (2006.01)

(52) U.S. Cl.

CPC ........... *A01B 76/00* (2013.01); *A01M 7/0082* (2013.01); *B62D 25/161* (2013.01); *B62D 25/166* (2013.01); *B62D 25/186* (2013.01)

(58) Field of Classification Search

CPC .. B62D 25/166; B62D 25/161; B62D 25/163; B62D 25/168; B62D 25/16; B62D 25/186; B62D 25/188; B62D 25/18; A01M 7/0082; A01M 7/0042; A01D 65/08; A01B 76/00

See application file for complete search history.

(56) References Cited

U.S. PATENT DOCUMENTS

| | | | | |
|---|---|---|---|---|
| 767,242 | A | 8/1904 | Reichle, Jr. | |
| 1,341,008 | A | 5/1920 | Brown | |
| 2,690,342 | A | 9/1954 | Willey | |
| 5,169,167 | A | 12/1992 | Wilson et al. | |
| 5,241,780 | A * | 9/1993 | Zaun | A01D 41/1261 47/1.7 |
| 5,403,026 | A | 4/1995 | Dahl | |
| 5,836,399 | A | 11/1998 | Maiwald et al. | |

(Continued)

FOREIGN PATENT DOCUMENTS

| | | |
|---|---|---|
| BR | 102021004699 | 9/2022 |
| CA | 2189592 | 5/2004 |

(Continued)

*Primary Examiner* — Christopher J Sebesta
*Assistant Examiner* — Julia C Tran
(74) *Attorney, Agent, or Firm* — Fletcher Yoder, P.C.

(57) ABSTRACT

A protective wheel frame of an agricultural working vehicle includes a segment configured to surround at least a front portion of a wheel of the agricultural working vehicle and a connection element. The protective wheel frame may also include additional frame segments that form a structure to support a rigid covering. A method for mounting the protective wheel frame on the agricultural working vehicle wheel includes steps for mounting and coupling segments and connecting elements of the protective wheel frame.

17 Claims, 7 Drawing Sheets

(56) References Cited

U.S. PATENT DOCUMENTS

| | | | | |
|---|---|---|---|---|
| 5,974,773 | A * | 11/1999 | Rieck | A01D 63/04 56/320 |
| 6,095,562 | A | 8/2000 | Bisse | |
| 6,349,954 | B1 | 2/2002 | Deziel | |
| 6,802,517 | B1 | 10/2004 | Wuthrich | |
| 6,893,048 | B2 | 5/2005 | Rush et al. | |
| 7,537,219 | B1 | 5/2009 | Sherwood | |
| 7,617,882 | B1 | 11/2009 | Street | |
| 7,669,798 | B2 | 3/2010 | Guering et al. | |
| 7,976,041 | B2 | 7/2011 | Chuang | |
| 8,388,003 | B2 | 3/2013 | Wellman et al. | |
| 8,770,655 | B1 | 7/2014 | Godby | |
| 9,603,305 | B2 | 3/2017 | Rau et al. | |
| 10,400,422 | B2 | 9/2019 | Angelo et al. | |
| 10,518,827 | B2 | 12/2019 | Morerira et al. | |
| 10,542,656 | B2 | 1/2020 | Blunier | |
| 10,602,733 | B1 | 3/2020 | Beyea | |
| 10,953,928 | B2 * | 3/2021 | Angelo | B62D 35/001 |
| 11,262,344 | B2 | 3/2022 | Schoeny | |
| 11,453,444 | B2 | 9/2022 | Bowen et al. | |
| 11,589,494 | B2 | 2/2023 | Smith et al. | |
| 11,753,082 | B2 | 9/2023 | Moradnia et al. | |
| 11,772,441 | B2 | 10/2023 | Lumini | |
| 11,980,115 | B2 | 5/2024 | Perez | |
| 2006/0108765 | A1 | 5/2006 | Teich | |
| 2010/0253034 | A1 | 10/2010 | Crismon et al. | |
| 2011/0080019 | A1 | 4/2011 | Castillo | |
| 2015/0230392 | A1 | 8/2015 | Schafer et al. | |
| 2016/0174454 | A1 * | 6/2016 | Phan | G01C 21/20 324/207.22 |
| 2018/0257716 | A1 * | 9/2018 | Haeseker | B62D 25/166 |
| 2019/0300069 | A1 | 10/2019 | Angelo | |
| 2022/0287288 | A1 | 9/2022 | de Andrade Alves et al. | |
| 2022/0287289 | A1 | 9/2022 | de Andrade Alves et al. | |
| 2023/0018825 | A1 | 1/2023 | Bowen et al. | |
| 2023/0106231 | A1 | 4/2023 | Perez | |
| 2023/0107894 | A1 | 4/2023 | Perez | |
| 2024/0051610 | A1 | 2/2024 | Perez | |

FOREIGN PATENT DOCUMENTS

| | | |
|---|---|---|
| EP | 4640501 | 10/2025 |
| FR | 2743345 | 7/1997 |
| FR | 2813847 | 3/2002 |
| GB | 2523673 | 9/2015 |
| KR | 101816438 | 1/2018 |
| WO | 2022120233 | 6/2022 |
| WO | 2023218256 | 11/2023 |

* cited by examiner

PROTECTIVE FRAME FOR WHEEL OF AN AGRICULTURAL WORKING VEHICLE AND METHOD FOR MOUNTING A PROTECTIVE FRAME ON A WHEEL OF AN AGRICULTURAL WORKING VEHICLE

CROSS-REFERENCE TO RELATED APPLICATION

This application claims priority from and the benefit of Brazilian Application No. BR 10 2021 019946 6, entitled “Protective Frame For Wheel Of An Agricultural Working Vehicle And Method For Mounting A Protective Frame On A Wheel Of An Agricultural Working Vehicle,” filed Oct. 4, 2021, which is hereby incorporated by reference in its entirety.

FIELD OF THE INVENTION

The present invention relates generally to protective frames and, more particularly, to a wheel protective frame for a wheel of an agricultural working vehicle.

BACKGROUND OF THE INVENTION

Various types of working vehicles use applicators (e.g., sprayers, floats, etc.) to deliver an substance (e.g., fertilizer, pesticides, herbicides, or other products) to a ground surface of a field. From this ground area agricultural crops can extend. The agricultural working vehicle may comprise an agricultural applicator having a boom assembly configured to facilitate product delivery over wide ranges of the field.

These working vehicles using applicators are robust and reach high heights, so that their wheels are high, and exceed the entire length of agricultural crops arranged in crop lines. To prevent the wheels of working vehicles from damaging the crops during their operation, a protective frame, or also known as a line opener, is used for the wheels.

A protective frame is a part that is coupled to the front of a wheel of an agricultural working vehicle (relative to the direction of travel of the vehicle). These frames aim to protect agricultural crops so that they are not run over or damaged by the wheels of the vehicle during their movement. As the agricultural working vehicle travels through the field, the wheels move in the space between the cultivation lines and the frames open the way between the lines, pushing aside the branches and branches of the agricultural crops that eventually are projected in the space between the cultivation lines.

U.S. Pat. No. 5,836,399A discloses a protective frame composed of closed plates and with the possibility of transverse adjustment to be accommodated in different spaces between cultivation lines. U.S. Pat. No. 5,403,026A describes an integral baffle frame welded with a boom tip at the front portion that moves branches away from agricultural crops projecting into the space between the crop lines.

Current protective frames, in addition to being bulky and heavy, take many hours to install. Further, the protective frames do not take into account the height of the agricultural crops that will be managed and do not allow different configurations of assemblies in their conceptions.

Accordingly, it is an object of the present invention to provide an improved protective frame for wheel of an agricultural working vehicle that solves the problems of the prior art.

BRIEF DESCRIPTION OF THE INVENTION

The aspects and advantages of the invention will be set forth in part in the following description, or may be obvious from the description, or may be learned through practice of the invention.

The present invention relates to a protective wheel frame of an agricultural working vehicle. In one embodiment, the protective frame includes a base segment. The base segment is configured to at least partially surround the front of a wheel of an agricultural working vehicle. The protective frame also includes at least one support element configured to stabilize the base segment on the wheel. The protective frame further includes a union element welded to the base segment and configured to join said base segment and the support element. The base segment includes at least one attachment point in at least one of its ends for attaching the frame to a structure of the wheel suspension, and the support element includes at least one attachment point at a first end for attaching to the structure of the wheel suspension. The union element includes at least one attachment point for attaching to a second end of the support element.

According to further or alternative embodiments of the present invention, the following characteristics, and possible variants thereof, may also be present, alone or in combination:

- the base segment is a single, modular part;
- the base segment has a fold in its length, wherein one of its ends maintains a linear segment, and the other end is arcuate and extends until it reaches the outside of the wheel;
- an arcuate and modular bearing segment that vertically surrounds at least part of the wheel on which its ends are disposed one on each inner and outer side of the wheel and are fixed on the base segment, a modular and curved side segment, furthermore its ends being fixed to the bearing segment and to the base follow on the outer side of the wheel, a junction element with at least one attachment point at each of its ends, said junction element being fixed at one end to the first end of the base segment and having its other end fixed to the bearing segment, and a modular auxiliary segment, with a fold in its length, fixed to the suspension structure of the wheel and parallel to the base segment;
- the lateral and support segments and the junction element may be shaped in a single piece;
- the base, support, lateral and auxiliary segments are tubular;
- a support element provided with at least one attachment point at each of its ends, one of its ends being fixed to the base segment and another of its ends being fixed to the support segment;
- at least one coupling, the coupling being a narrow plate with forked ends at two ends with at least one attachment point at each of its ends;
- a rigid cover, said cover being arranged on a protective frame structure formed by the base, support, lateral and auxiliary segments and support, junction, optionally support, coupling and union elements;
- the attachment of the base, support, lateral and auxiliary segments, the support, junction, support, coupling and union elements and the rigid cover is done by means of removable fixing devices;
- the rigid cover is composed of three couplable plates, one front plate and two side flaps;
- the rigid cover is of plastic material; and the connection of the plates attachable to the frame and the fastening of the rigid cover are made by means of removable fastening devices, and wherein the cover is joined to the frame via the at least one coupling element.

In order to circumvent the drawbacks of the above-mentioned prior art, among others, the present invention also deals with a method for mounting a protective frame on a wheel of an agricultural working vehicle. The method for mounting the protective frame includes mounting a support element on the inside of a wheel of an agricultural working vehicle. The support element has a first end fixed on a frame of the wheel suspension in at least one attachment point. The method also includes a step of mounting a base segment on the wheel of an agricultural working vehicle, wherein an upper end of the base segment is fixed to the suspension frame of the wheel in at least one attachment point and a lower end of the base segment is arcuate and extends until it reaches the outside of the wheel. The support element and the base segment being joined by means of a union element fixed to the base segment, wherein a second end of the support element is fixed to the union element in at least one attachment point.

According to further or alternative embodiments of the present invention, the following characteristics, and possible variants thereof, may also be present, alone or in combination:

steps for mounting i) a junction element, at the upper end of the base segment, ii) a support segment on the base segment and the junction element, wherein the support segment vertically surrounds at least part of the wheel and has two ends, one end being fixed to the portion of the base segment that is on the outside of the wheel and the other end of the support segment being fixed to the portion of the base segment that is on the inside of the wheel, iii) a side segment in the portion of the support segment and the base segment that are on the outside of the wheel, iv) an auxiliary segment in the inside of the wheel of a working vehicle, wherein an upper end of the auxiliary segment is fixed on the wheel suspension structure in at least one point, and a lower part of the auxiliary segment is fixed on the union element at least one point, and v) at least one coupling element in the arcuate part of the base segment;

the assembly of the junction element, the support segment and the side segment are made simultaneously when conformed into a single piece;

mounting a support element between the base segment and the support segment, a first end of the support element being fixed to the base segment and a second end of the support element being fixed to the support segment;

coupling a rigid cover onto a protective frame structure formed by the base, support, lateral and auxiliary segments and support, junction, support, coupling and union elements, wherein the fixing of the cover to the structure is done by means of removable fixing devices; and a front plate on the support segment, an outer side flap on the side segment on the outside of the wheel, and an inner side flap on the auxiliary segment and the junction element on the inside of the wheel, wherein the front plate is joined to the protective frame structure via the at least one coupling element.

These and other aspects, functions and advantages of the present invention will be better understood by reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE FIGURES

A complete and enabling description of the present invention, which includes its different embodiments, directed to a person of ordinary skill in the art, is set forth in the specification, which makes reference to the accompanying drawings, in which.

DETAILED DESCRIPTION OF THE INVENTION

Figure 1:
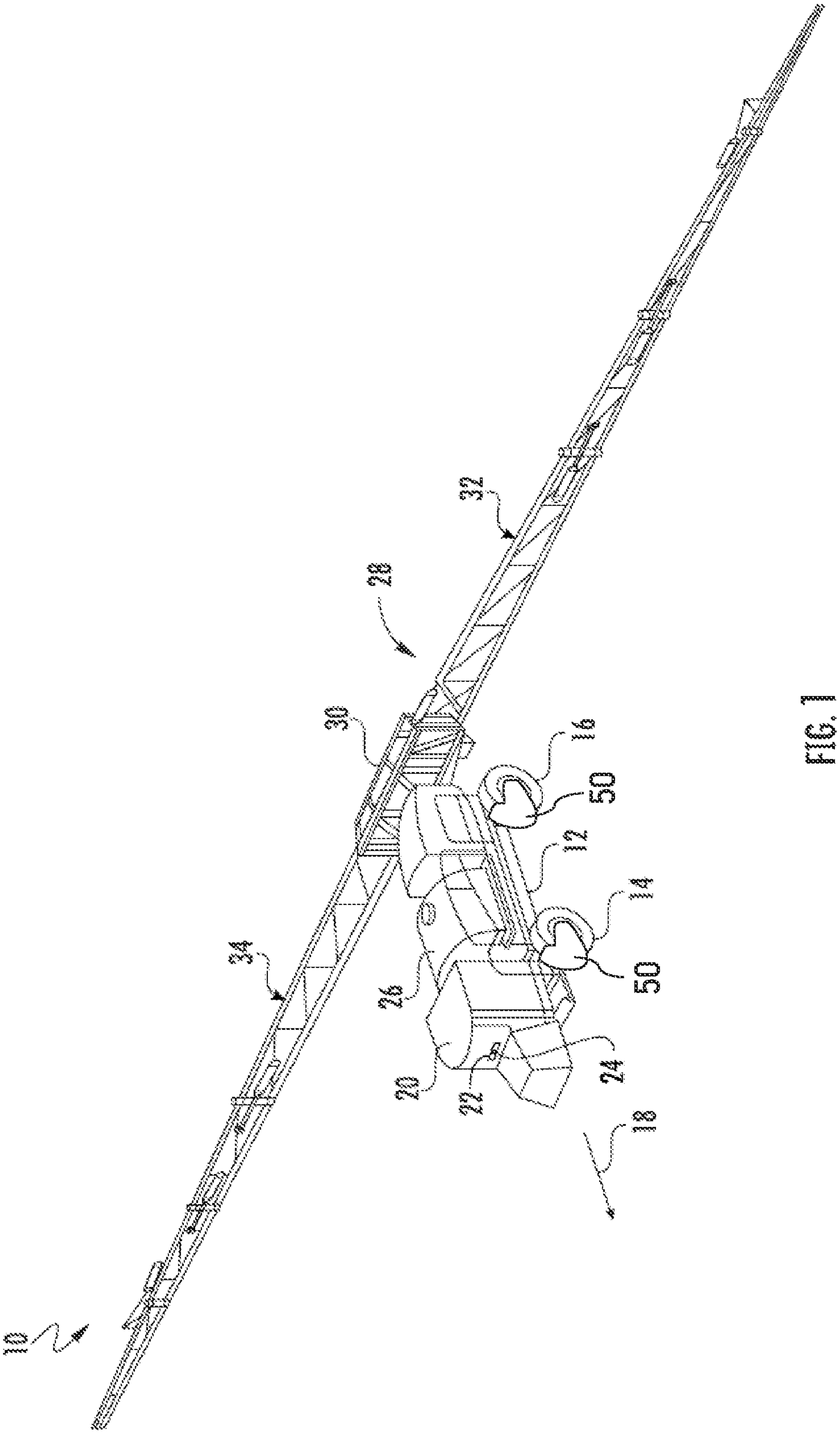
FIGS. 1 and 2 illustrate perspective and side views, respectively, of an agricultural working vehicle on which protective frames are used according to aspects of the present subject matter.

Reference will now be made in details to the embodiments of the invention, one or more examples of which are illustrated in the drawings. Each example is provided by way of explanation of the invention, without limitation of the invention. Indeed, it will be apparent to those skilled in the art that various modifications and variations may be made in the present invention, without departing from the scope or spirit of the invention. For example, the functions illustrated or described as part of some embodiments may be used with another embodiment to further produce an additional embodiment. Accordingly, the present invention should encompass such modifications and variations as they are presented within the scope of the appended claims and their equivalents.

In the present document, relational terms, such as first and second, upper and lower, and the like, are used only to distinguish one entity or action from another entity or action without necessarily requiring one to imply any actual relationship or order between such entities or actions. The terms “comprises,” “comprising,” or any other variation thereof, shall encompass a non-exclusive inclusion such that a process, method, article, or apparatus comprising a list of elements does not include only those elements but includes other elements not expressly listed or inherent to such process, method, article, or apparatus. An element preceded by “comprises . . . a” does not, without further restrictions, prohibit the existence of additional identical elements in the process, method, article or apparatus comprising the element.

As used herein, the term “and/or,” when used in a list of two or more items, means that any of the listed items may be employed by itself or any combination of two or more listed items may be employed. For example, if a composition or assembly is described as containing components A, B, and/or C, the composition or assembly may contain only A; only B; only C; A and B in combination; A and C in combination; B and C in combination; or A, B, and C in combination.

Generally, the present invention relates to a protective frame, also known as a line opener, for wheel of an agricultural working vehicle and to a method for mounting a protective frame on a wheel of an agricultural working vehicle. The protective frame is mounted on the front of the wheels of an agricultural working vehicle.

The protective frame includes a base segment, the base segment being and configured to at least partially surround the front of a wheel of an agricultural working vehicle. The frame also includes at least one connecting element, called a support element, configured to stabilize the base segment on the wheel; and another connecting element, called a union element, fixed in particular by welding to the base segment and configured to join said base segment and the support element. The base segment includes at least one attachment point in at least one of its ends for attaching to a frame of the wheel suspension, the support element includes at least one attachment point at a first end for attaching to the frame of the wheel suspension, and the union element includes at least one attachment point for attaching to a second end of the support element.

The stabilization of the base segment in the wheel suspension structure carried out by the support element is focused in that the protective frame is stable and does not go into shaking during the operation of the agricultural working vehicle.

The method for mounting the protective frame on a wheel of an agricultural working vehicle includes mounting a connection element, referred to as a support element, on the inside of a wheel of an agricultural working vehicle. The support element has a first end fixed on a frame of the wheel suspension in at least one attachment point. The method also includes a step of mounting a base segment on the wheel of an agricultural working vehicle, wherein an upper end of the base segment is fixed to the suspension frame of the wheel in at least one attachment point and a lower end of the base segment is arcuate and extends until it reaches the outside of the wheel. The support element and the base segment being joined by means of another connection element known as junction element that is fixed to the base segment, and wherein a second end of the support element is fixed to the union element in at least one attachment point.

Alternatively, the method may include steps for mounting i) a connection element, known as junction element, at the upper end of the base segment, ii) a support segment on the base segment and the junction element, wherein the support segment vertically surrounds at least part of the wheel and has two ends, one end being fixed to the portion of the base segment that is on the outside of the wheel and the other end of the support segment being fixed to the portion of the base segment that is on the inside of the wheel, iii) a side segment in the portion of the support segment and the base segment that are on the outside of the wheel, iv) an auxiliary segment in the inside of the wheel of a working vehicle, wherein an upper end of the auxiliary segment is fixed on the wheel suspension structure in at least one point, and a lower part of the auxiliary segment is fixed on the union element at least one point, and v) at least one more other connection element, known as coupling element in the arcuate part of the base segment.

Figure 2:
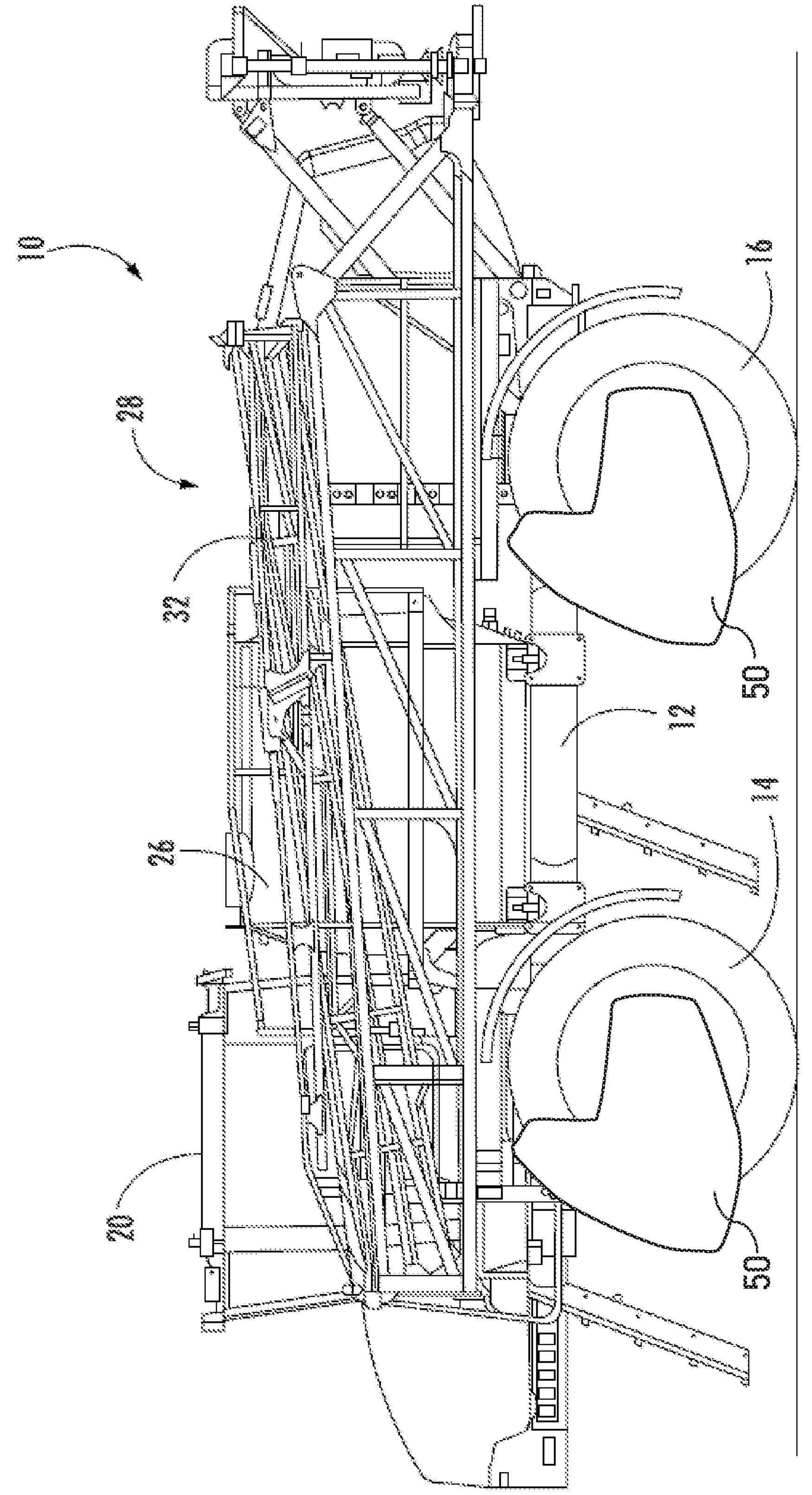

Referring now to FIGS. 1 and 2, it is illustrated an agricultural working vehicle 10 configured as a self-propelled agricultural applicator. Embodiments of the invention are configured to be applied to wheels of such vehicles.

In various embodiments, the working vehicle 10 may include a chassis 12 configured to support or couple to a plurality of components. For example, the front and rear wheels 14, 16 may be coupled to the chassis 12. The wheels 14, 16 may be configured to support the working vehicle 10 relative to a ground surface and move the working vehicle 10 in a travel direction (e.g., as indicated by arrow 18 in FIG. 1) in a field or on the ground surface. Accordingly, the working vehicle 10 may include a power unit, such as a motor, a driving machine, or a hybrid motor-driving machine combination, for moving the vehicle 10 along the field. In some instances, the working vehicle 10 may also include a transmission configured to transmit power from the engine to any of the wheels 14, 16.

The chassis 12 may also support an operator station 20, such as a cabin, that provides various control or input devices (e.g., levers, pedals, control panels, buttons, and/or the like) to allow an operator to control the operation of the working vehicle 10. For example, as shown in FIG. 1, the working vehicle 10 may include a human-machine interface (HMI) 22 to display messages and/or alerts to the operator and/or to allow the operator to interface with the vehicle controller. In some embodiments, the HMI 22 may include one or more user input devices 24 in the form of switches, knobs, rotary knobs, and/or any other device that allows the operator to provide user inputs to the controller.

In addition, the chassis 12 may also support a tank 26 and a boom assembly 28 mounted to the chassis 12. The tank 26 is generally configured to store or retain an agricultural substance, such as a pesticide, a fungicide, a rodenticide, a fertilizer, a nutrient, and/or the like. The agricultural substance stored in the tank 26 may be dispensed onto the underlying ground surface (e.g., plants and/or ground) via the one or more dispensers (such as, nozzles) mounted on the boom assembly 28.

As shown in FIGS. 1 and 2, the boom assembly 28 may include a frame that supports the first and second boom arms 32, 34 in cantilever. The first and second boom arms 32, 34 are generally movable between an operational or unfolded position (FIG. 1) and a non-operational or folded position (FIG. 2). During product dispensing, the first and/or second boom arms 32 34 extend laterally outward from the working vehicle 10 in order to cover wide ground application ranges, as illustrated in FIG. 1. However, in order to facilitate transport, each boom arm 32, 34 of the boom assembly 28 may be independently folded back or forth in the non-operational position, thereby reducing the overall width of the vehicle 10 or, in some examples, the overall width of a towable implement when the applicator is configured to be towed behind the working vehicle 10.

Figure 3:
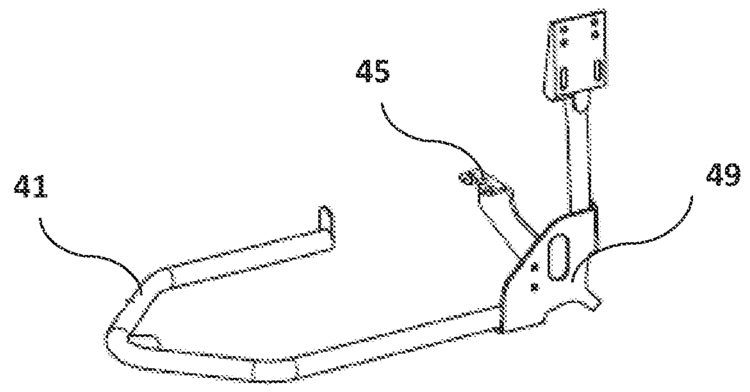
FIG. 3 illustrates a perspective view of a protective frame for a wheel of an agricultural working vehicle according to an aspect of the present subject matter.

Referring to FIG. 3, there is illustrated a protective frame formed by a base segment 41 and supporting elements 45 and 49.

The embodiment illustrated in FIG. 3 is suitable for agricultural crops of higher heights. It was found that for these types of crops, a protective frame comprised only of a base segment promotes greater protection against possible damage caused by the wheels of the vehicle when passing between the cultivation lines. However, this is not limited to larger agricultural crops but can also be applied to smaller agricultural crops.

Figure 4:
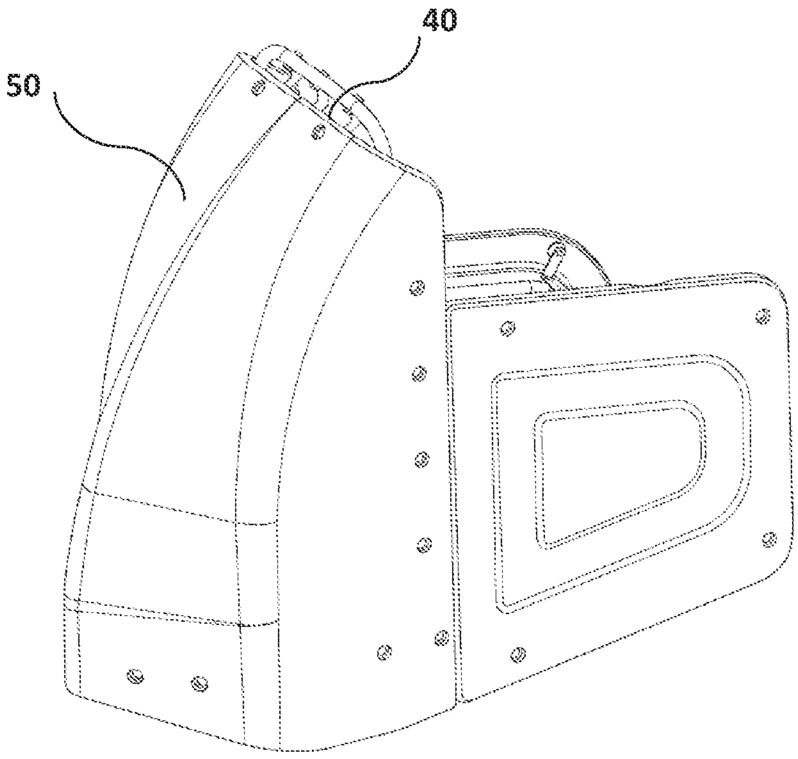
FIGS. 4 and 5 illustrate front and rear perspective views of a protective frame for a wheel of an agricultural working vehicle according to another aspect of the present subject matter.
Figure 5:
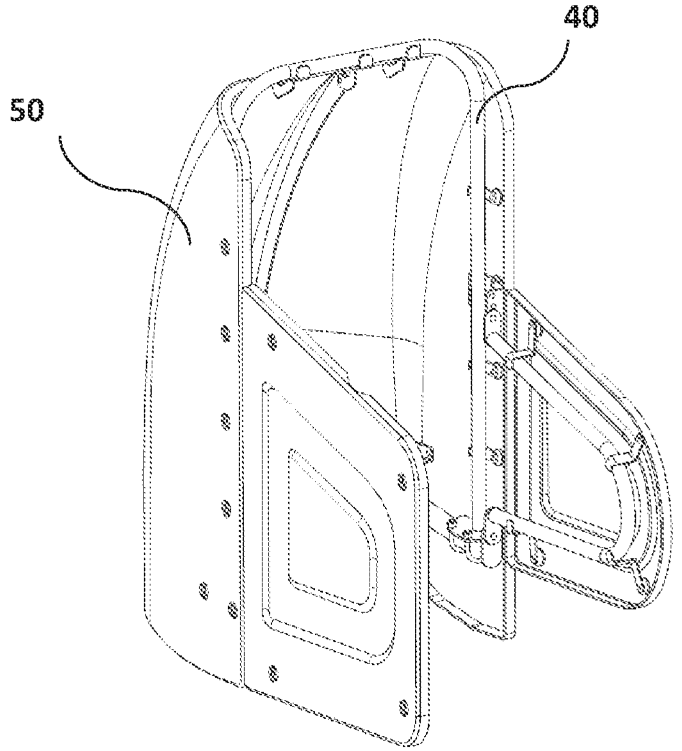

In FIGS. 4 and 5, illustrated is a protective frame 50 that includes a protective frame structure 40 formed by frame segments to support a rigid cover 50. In the particular embodiment, the structure 40 is comprised of metal alloys, for example aluminum, iron, steel, in addition to being tubular. The cover 50 is rigid and may be of plastic material, for example polymeric materials (polyethylene, polypropylene, PVC). The frame 40 surrounds at least a front portion of a wheel of an agricultural working vehicle. The fastening between frame segments and the cover 50 is done at fastening points by fastening devices. These attachment devices may be of screws or clamps types, these types being illustrative and not exhaustive.

Further, the embodiment illustrated in FIGS. 4 and 5 is suitable for agricultural crops of smaller heights. It has been found that for these types of crops, a structure 40 with a rigid cover 50 promotes greater protection of the crops against possible damage caused by the wheels of the vehicle when passing between the crop lines. However, this embodiment is not limited to smaller agricultural crops but can also be applied to larger agricultural crops.

Figure 6:
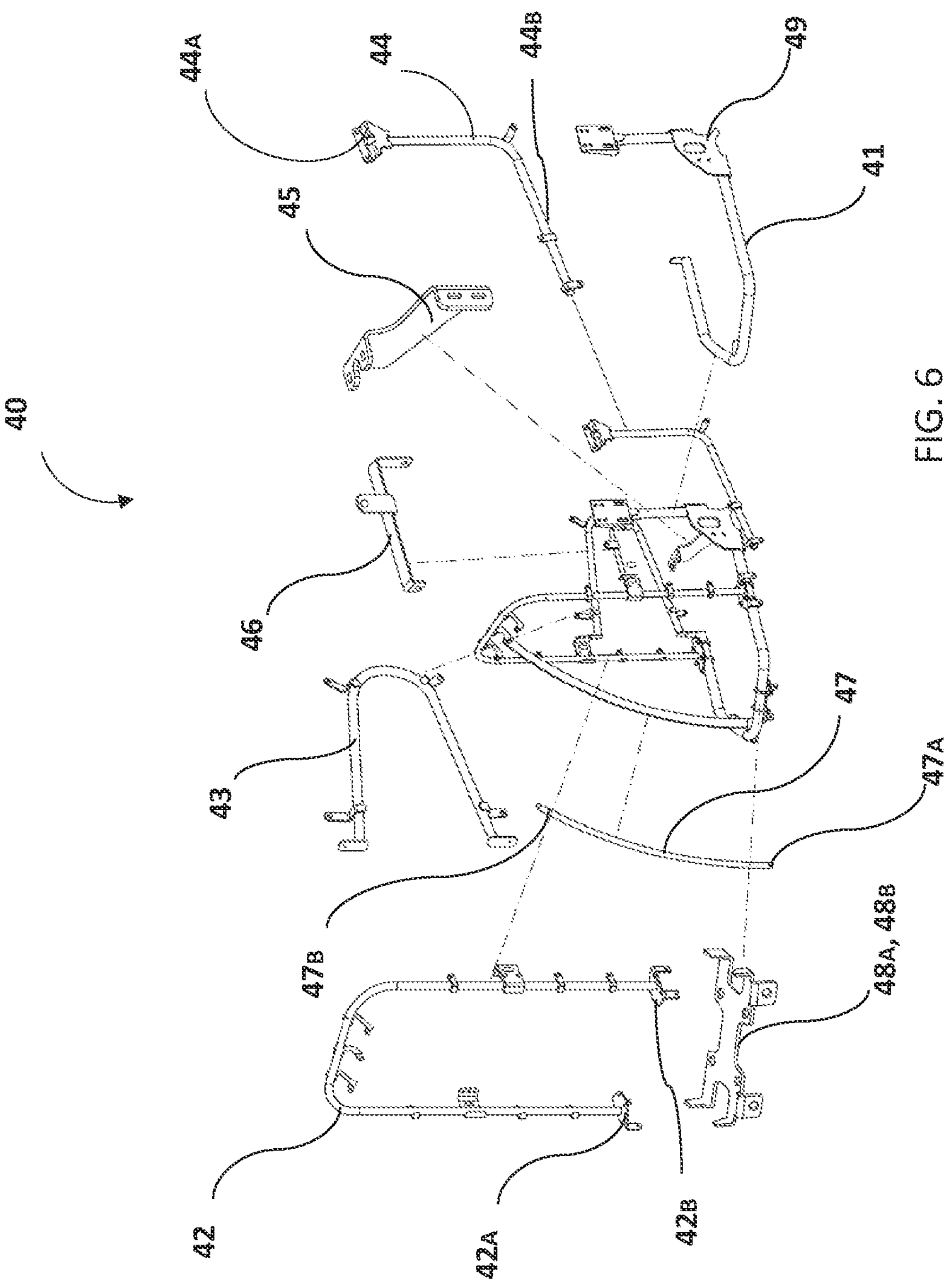
FIGS. 6 and 7 illustrate exploded views of components of a protective frame for a wheel of an agricultural working vehicle according to aspects of the present subject matter.

FIG. 6 illustrates an exploded view of the structure of protective frame 40. The structure of protective frame is comprised of frame segments, being a base segment 41, support segment 42, side segment 43, auxiliary segment 44, and connection elements, being a support element 45, junction element 46, optionally a support element 47, coupling element 48A, 48B, and a junction element 49 welded to the base segment 41. The coupling element 48A, 48B is designed to couple the cover 50 to the structure 40. Segments 41, 42, 43, 44 are tubular. The attachment of the frame segments and connection elements is done at attachment points by means of fastening devices. These attachment devices may be of screws or clamps types, these types being illustrative and not exhaustive.

Among the connection elements, at least the support element 45 is aimed at stabilizing a base segment 41, or the frame 40, on a wheel 14, 16 of an agricultural working vehicle 10. The stabilization of the segment 41 or the frame 40 on the wheel 14, 16 carried out by the support element 45 is aimed so that the protective frame is stable, does not tremble, or does not move relative to the wheel 14, 16 during operation of the agricultural working vehicle 10. The support element 45 includes at least one attachment point at a first end for attaching to a frame of the wheel suspension 14, 16, and includes at least one attachment point at a second end for attaching to a base segment 41 via a junction element 49. The junction element 49 is weld-fastened to the base segment 41 and includes at least one fastening point for fastening to the second end of the support element 45. The upper end of the base segment 41 includes at least one attachment point for being fixed to the wheel suspension frame 14, 16 of an agricultural working vehicle 10.

The protective frame structure 40 may include four segments 41, 42, 43, 44 and five connection elements, being a support element 45, junction element 46, support element 47, coupling element 48A, 48B and junction element 49.

In one possible embodiment of the protective frame structure 40, the segments 42 and 43 and the junction element 46 may be shaped into a single welded piece and the support element 47 be removed from the frame.

The base segment 41 is a single, modular piece, with a fold in its length, wherein one of its ends maintains a linear segment, and the other end is arcuate and extends until it reaches the outside of the wheel. The support segment 42 is a single arcuate piece that vertically surrounds at least part of a wheel, wherein its ends are disposed one on each inner and outer side of the wheel and are fixed on the base segment 41. The lateral segment 43 is a single piece, with a curvature close to the central region, and its ends are fixed to the bearing segment 42 and the base segment 41 on the outer side of the wheel. The auxiliary segment 44 is a single piece, with a fold in its length, positioned on the inner side of the wheel, and displaced parallel to the base segment 41.

The connecting elements 45, 46, 47, 48A, 48B, 49 are integral and rigid parts, which have at least one attachment point at their ends. The support element 45 is a narrow plate with at least one attachment point at each of its ends. The junction element 46 is a narrow, linear plate with at least one attachment point at each of its ends, said junction element being fixed at one of its ends to the first end of the base segment 41 and having its other end fixed to the support segment 42. The optional support element 47 is a narrow, curved plate with at least one attachment point at each of its ends, one of its ends being fixed to the base segment 41 and the other of its ends being fixed to the support segment 42. The coupling element 48A, 48B is a narrow plate with forked ends at two ends and at least one attachment point at each of its ends. The joining element 49, fixed in particular by welding to the base segment 41, is a small plate with fixing points for joining different parts of the protective frame.

The bearing 42 and lateral 43 segments and the junction element 46 may be shaped into a single piece.

Figure 7:
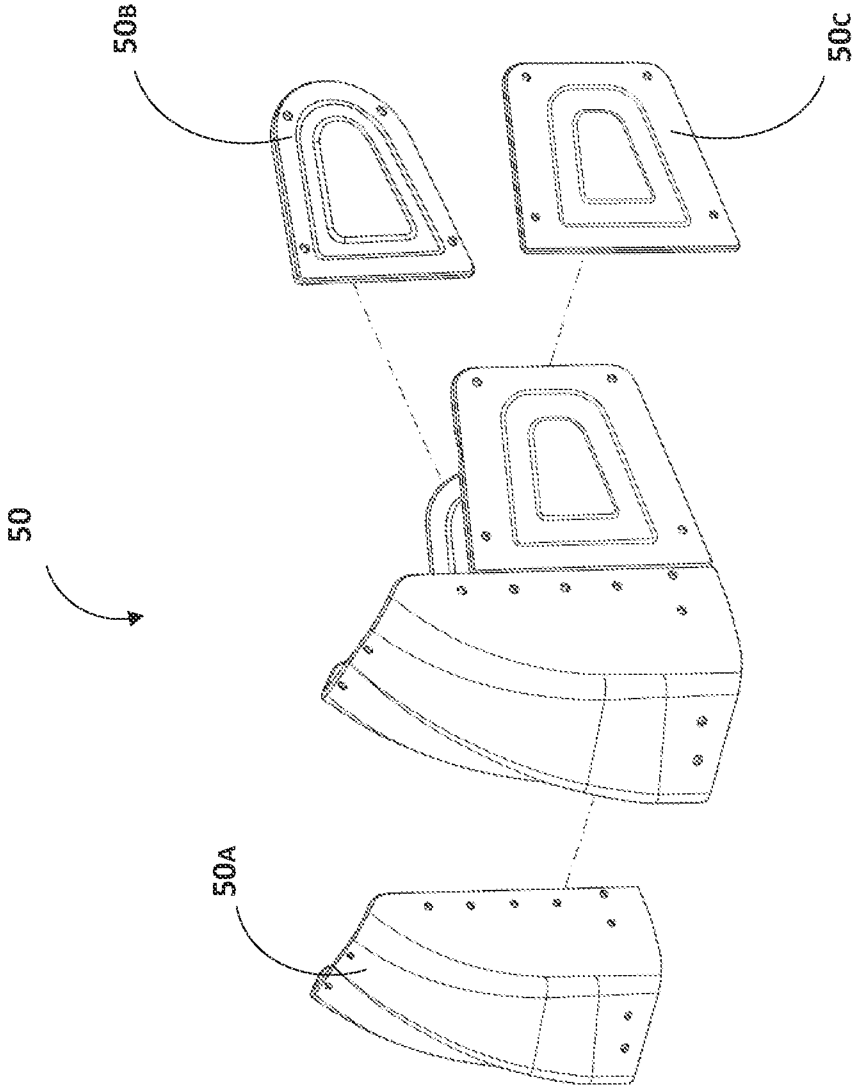

FIG. 7 illustrates an exploded view of a rigid cover 50 that may be coupled to a protective frame structure 40 formed by segments 41, 42, 43, 44 and support elements 45, junction 46, optionally support 47, coupling 48A, 48B, and junction 49. The rigid cover 50 is comprised of three couplable plates 50A, 50B, 50C, one front plate 50*a* and two outer side flaps 50B and inner 50C. The connection of the attachable plates 50A, 50B, 50C and the fastening of the rigid cover 50 to the protective frame structure 40 are made by means of removable fastening devices. These attachment devices may be of screws or clamps types, these types being illustrative and not exhaustive.

The attachment of attachable plates 50A, 50B, 50C to the protective frame may further include additional attachment points positioned along the length of the segments 41, 42, 43, 44 and the connection elements 45, 46, 47, 48A, 48B, 49, as needed.

Figure 8:
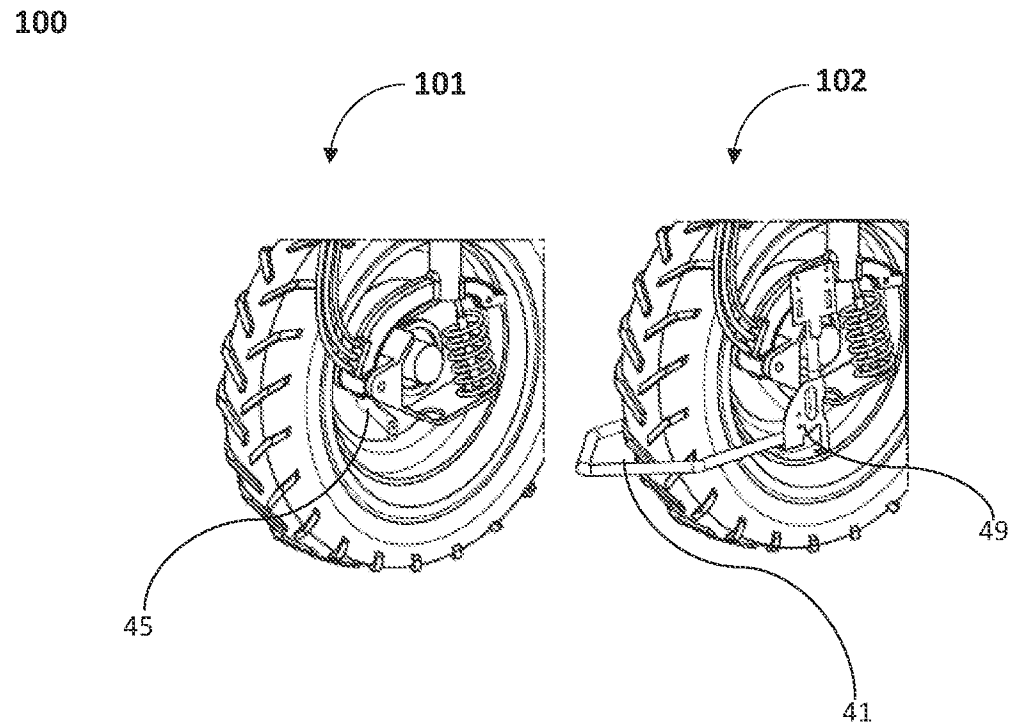
FIGS. 8 and 9 illustrate steps of assembling a protective frame on a wheel of an agricultural working vehicle according to aspects of the present disclosure.

FIG. 8 illustrates a method 100 for mounting an embodiment of the protective frame, illustrated in FIG. 3, on a wheel of an agricultural working vehicle, according to aspects of the present disclosure. In the illustrated embodiment, the method includes a step for mounting 101 a support element 45 on the inner part of a wheel 14, 16 of an agricultural vehicle 10, wherein a first end of the support element 45 is fixed to a wheel suspension frame 14, 16 in at least one attachment point, and another step 102 for mounting a base segment 41 on the wheel 14, 16 of the agricultural working vehicle 10, wherein an upper end of the base segment 41 is fixed to the wheel suspension frame 14, 16 in at least one attachment point, and a lower end of the base segment 41 is arcuate and extends until it reaches the outer part of the wheel. Furthermore the support element 45 and the base segment 41 are joined by means of a junction element 49 fixed to the base segment 41, wherein a second end of the support element 45 is fixed to the junction element 49 in at least one attachment point.

Figure 9:
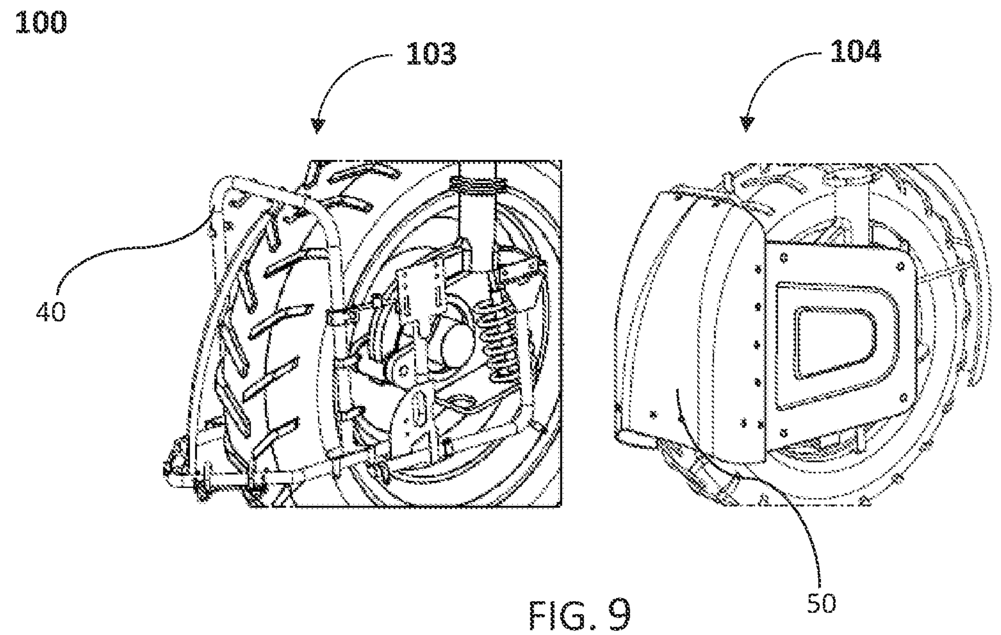

Further, FIG. 9 illustrates a further sequencing of steps to the method 100 for mounting a protective frame, as illustrated in FIGS. 4 and 5, with a rigid cover 50 over the protective frame structure 40 on a wheel 14, 16 of an agricultural working vehicle 10 according to aspects of the present disclosure. In the illustrated embodiment, the method includes an additional step of assembling 103 additional segments to form the protective frame structure 40.

The step 103 includes mounting a junction element 46 on the upper end of the base segment 41; a support segment 42 on the base segment 41 and the junction element 46, wherein the support segment 42 vertically surrounds at least part of the wheel and has two ends 42A, 42B, one end 42A being fixed to the portion of the base segment 41 that is on the outside of the wheel and the other end 42B of the support segment 42 being fixed to the portion of the base segment 41 that is on the inside of the wheel; a lateral segment 43 on the portion of the support segment 42 and the base segment 41 that are on the outside of the wheel; an auxiliary segment 44 on the inside of the wheel 14, 16 of a working vehicle 10, wherein an upper end 44A of the auxiliary segment 44 is fixed on the wheel suspension frame in at least one point, and a lower part 44B of the auxiliary segment 44 is fixed on the union element 49 in at least one point; and at least one coupling element 48A, 48B on the arcuate part of the base segment 41.

As an alternative, the assembly of the junction element 46, the support segment 42 and the side segment 43 are made simultaneously when conformed into a single piece. Optionally, the mounting step 103 includes a support element 47 between the base segment 41 and the support segment 42, a first end 47*a* of the support element 47 being attached to the base segment 41 and a second end 47B of the support element 47 being attached to the support segment 42.

Further, in FIG. 9 it is illustrated step 104 for coupling a rigid cover 50 onto a protective frame structure 40 formed by segments 41, 42, 43, 44 and support elements 45, junction 46, support 47, coupling 48A, 48B, and junction 49. The step 104 includes coupling of:

a front plate 50*a* on the support segment 42, wherein the front plate 50*a* is joined to the protective frame structure 40 via the at least one coupling element 48A, 48B;

an outer side flap 50B on the side segment 43 on the outer part of the wheel 14, 16; and an inner side flap 50C on the auxiliary segment 44 and on the junction element 46 on the inner part of the wheel 14, 16.

The present invention brings the advantage of the interchangeability of the possible embodiments of the protective frame, providing a flexibility for users to work with the protective frame open (embodiment illustrated in FIG. 3, including only the support element 45 and the base follow 41) or with the protective frame closed (embodiment illustrated in FIGS. 4 and 5, including a rigid cover 50 on a protective frame structure 40). This interchangeability of the elements provides a more suitable protective frame for each type of agricultural crop where the agricultural working vehicle will be used. The simplicity of the assembly steps of the protective frame, as illustrated in FIGS. 8 and 9, expresses the ability to change between one embodiment and another of the protective frame, between open and closed, providing agility to the assembly, in addition to providing the most appropriate use of the protective frame according to the needs of each agricultural crop.

The modularity of the protective frame, comprised of elements and couplable and light plates, also contributes to the fast and easy execution of the interchangeability.

This disclosure uses examples to describe the invention, in several embodiments, and also to enable any person skilled in the art to practice the invention, including producing and using any devices or systems and performing any incorporated methods. The patentable scope of the invention is defined by the claims, and may include other examples that occur to those skilled in the art. Such other examples are intended to fall within the scope of the claims if they include structural elements that do not differ from the literal language of the claims, or if they include equivalent structural elements with non-substantial differences from the literal languages of the claims.

The invention claimed is:

1. A protective frame for a wheel of an agricultural working vehicle, the protective frame comprising:

a base segment configured to at least partially surround a front of the wheel of the agricultural working vehicle, wherein the base segment is an elongated frame member;

a support element configured to block movement of the base segment; and a junction element fixed to the base segment and configured to join the base segment and the support element;

wherein the base segment comprises at least one attachment point in at least one end to secure the base segment to a wheel suspension frame;

wherein the support element comprises at least one attachment point at a first end to attach to the wheel suspension frame;

wherein the junction element comprises at least one attachment point to attach to a second end of the support element;

wherein the base segment has a fold in a length of the base segment, a first portion of the base segment maintains a linear segment, and a second portion of the base segment is arcuate and extends until reaching an outside of the wheel; and wherein the junction element is configured to be positioned on an inside of the wheel, the junction element is positioned at an intersection of the first and second portions of the base segment, and the first portion extends upwardly from the junction element to the at least one attachment point of the base segment.

2. The protective frame according to claim 1, wherein the base segment is a single, modular part.

3. The protective frame according to claim 1, comprising:

an arcuate and modular bearing segment which vertically surrounds at least part of the wheel, wherein ends of the arcuate and modular bearing segment are arranged one on each inner and outer side of the wheel and are fixed on the base segment;

a modular and curved side segment, wherein ends of the modular and curved side segment are fixed to the arcuate and modular bearing segment and to the base segment on the outer side of the wheel;

an additional junction element with at least one attachment point at each end, the additional junction element being fixed at one end to a first end of the base segment and having the other end fixed to the arcuate and modular bearing segment; and a modular auxiliary segment with a fold in a length of the modular auxiliary segment, fixed to the wheel suspension frame and parallel to the base segment.

4. The protective frame according to claim 3, wherein the arcuate and modular bearing segment, the modular and curved side segment, and the additional junction element are shaped in a single piece.

5. The protective frame according to claim 3, wherein the base segment, the arcuate and modular bearing segment, the modular and curved side segment, and the modular auxiliary segment are tubular.

6. The protective frame according to claim 3, comprising:

an additional support element provided with at least one attachment point at each end, one end of the additional support element being fixed to the base segment and the other end of the additional support element being fixed to the arcuate and modular bearing segment.

7. The protective frame according to claim 6, comprising at least one coupling, wherein each of the at least one coupling being a narrow plate with forked ends at two ends with at least one attachment point at each end thereof.

8. The protective frame according to claim 6, comprising:

a rigid cover, the rigid cover being arranged on a protective frame structure formed by the base segment, the arcuate and modular bearing segment, the modular and curved side segment, the modular auxiliary segment, the support element, and the additional junction element.

9. The protective frame according to claim 8, comprising at least one coupling, wherein fastening of the base segment, the arcuate and modular bearing segment, the modular and curved side segment, the modular auxiliary segment, the support element, the additional junction element, the additional support element, the at least one coupling, the junction element, and the rigid cover is done by means of removable fastening devices.

10. The protective frame according to claim 8, wherein the rigid cover comprises three couplable plates, including one front plate and two side flaps.

11. The protective frame according to claim 10, comprising at least one coupling, wherein connection of the three couplable plates to the protective frame structure and fastening of the rigid cover are made via removable fastening devices, and the rigid cover is joined to the protective frame structure through the at least one coupling.

12. A method for mounting a protective frame on a wheel of an agricultural working vehicle, the method comprising:

mounting a support element on an inside of the wheel of the agricultural working vehicle, wherein a first end of the support element is fixed on a wheel suspension frame by at least one attachment point of the support element;

mounting a base segment on the wheel of the agricultural working vehicle, wherein the base segment is an elongated frame member, a first portion of the base segment is fixed to the wheel suspension frame by at least one attachment point of the base segment, a second portion of the base segment is arcuate and extends until the second portion reaches an outer part of the wheel, the support element and the base segment are joined via a junction element fixed to the base segment, a second end of the support element is fixed to the junction element by at least one attachment point of the junction element, and the support element is configured to block movement of the base segment; and mounting:

an additional junction element to the first portion of the base segment;

a bearing segment on the base segment and the additional junction element, wherein the bearing segment vertically surrounds at least part of the wheel and has two ends, one end of the bearing segment being fixed to a portion of the base segment that is on an outside of the wheel, and the other end of the bearing segment being fixed to a portion of the base segment that is on the inside of the wheel;

a side segment in a portion of the bearing segment and the portion of the base segment that are on the outside of the wheel;

an auxiliary segment on an inner part of the wheel of the agricultural working vehicle, wherein an upper part of the auxiliary segment is fixed on the wheel suspension frame in at least one point, and a lower part of the auxiliary segment is fixed on the junction element in at least one point; and at least one coupling element in the second portion of the base segment.

13. The method according to claim 4, wherein assembly of the additional junction element, the bearing segment, and the side segment are made simultaneously when conformed into a single piece.

14. The method according to claim 12, wherein the mounting further comprises:

mounting an additional support element between the base segment and the bearing segment, a first end of the additional support element being fixed to the base segment, and a second end of the additional support element being fixed to the bearing segment.

15. The method according to claim 14, comprising:

coupling a rigid cover onto a protective frame structure formed by the base segment, the bearing segment, the side segment, the auxiliary segment, the support element, the additional junction element, the additional support element, the at least one coupling element, and the junction element, wherein coupling the rigid cover onto the protective frame structure is done via removable fastening devices.

16. The method according to claim 15, wherein coupling the rigid cover onto the protective frame structure further comprises coupling:

a front plate on the bearing segment;

an outer side flap on the side segment on the outer part of the wheel; and an inner side flap on the auxiliary segment and on the additional junction element on the inner part of the wheel;

wherein the front plate is joined to the protective frame structure via the at least one coupling element.

17. A protective frame for a wheel of an agricultural working vehicle, the protective frame comprising:

a base segment configured to at least partially surround a front of the wheel of the agricultural working vehicle, wherein the base segment comprises at least one attachment point in at least one end to secure the base segment to a wheel suspension frame;

a support element configured to stabilize the base segment on the wheel, wherein the support element comprises at least one attachment point at a first end to attach to the wheel suspension frame;

a junction element fixed to the base segment and configured to join the base segment and the support element, wherein the junction element comprises at least one attachment point to attach to a second end of the support element;

an arcuate and modular bearing segment which vertically surrounds at least part of the wheel, wherein ends of the arcuate and modular bearing segment are arranged one on each inner and outer side of the wheel and are fixed on the base segment;

a modular and curved side segment, wherein ends of the modular and curved side segment are fixed to the arcuate and modular bearing segment and to the base segment on the outer side of the wheel;

an additional junction element with at least one attachment point at each end, the additional junction element being fixed at one end to a first end of the base segment and having the other end fixed to the arcuate and modular bearing segment; and a modular auxiliary segment with a fold in a length of the modular auxiliary segment, fixed to the wheel suspension frame and parallel to the base segment.

* * * * *